Sept. 25, 1945.     G. D. MARCY     2,385,456
METHOD OF MAKING MOLDS
Original Filed June 26, 1941     2 Sheets-Sheet 1
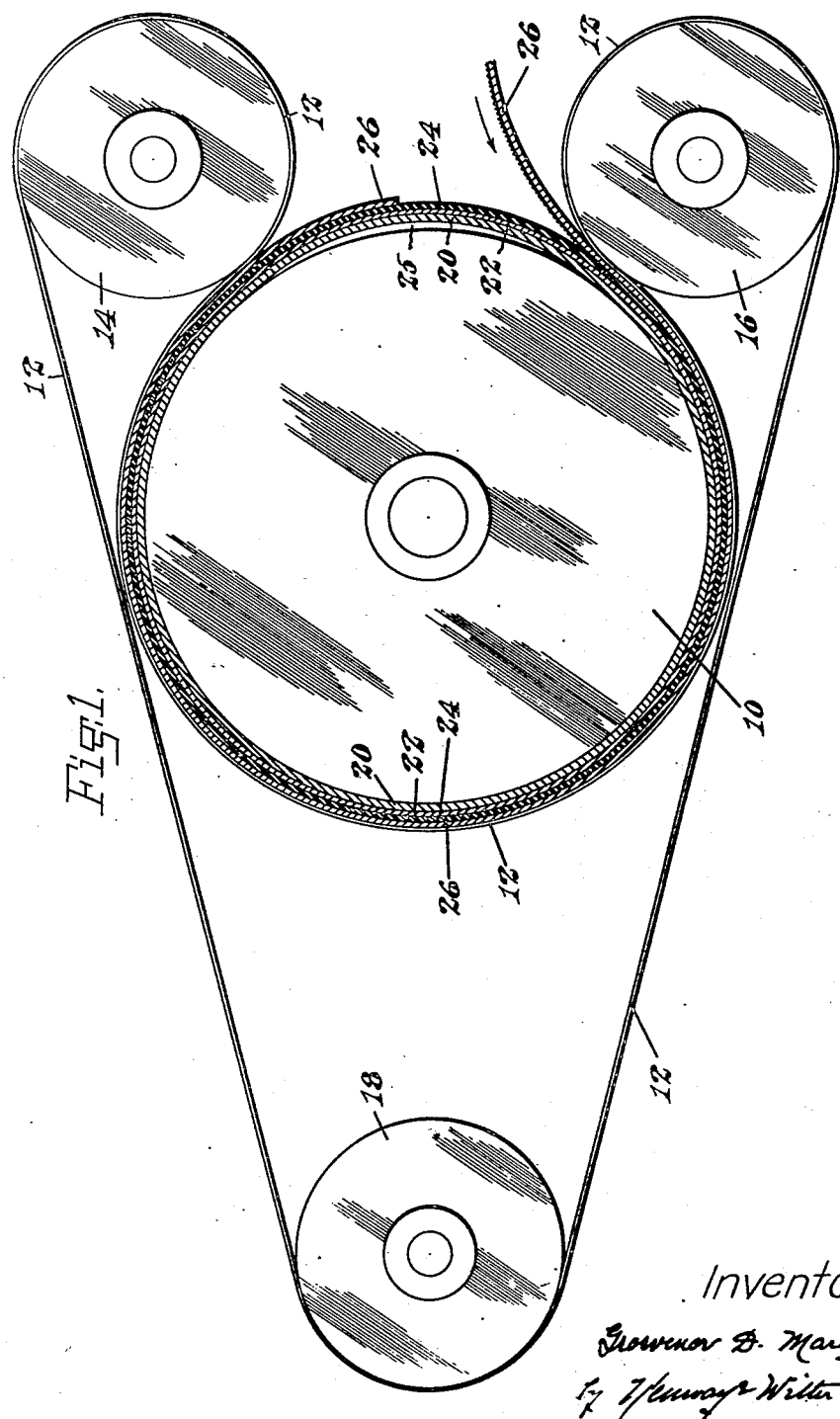

Sept. 25, 1945.  G. D. MARCY  2,385,456
METHOD OF MAKING MOLDS
Original Filed June 26, 1941   2 Sheets—Sheet 2
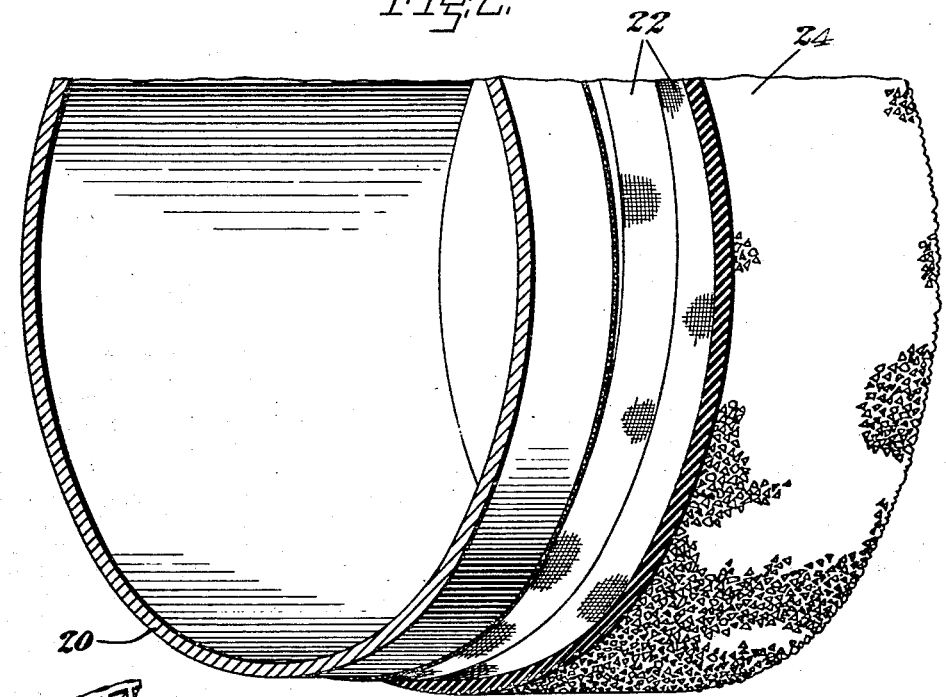
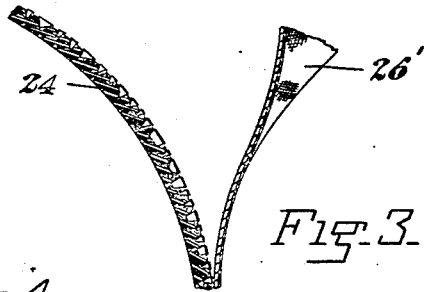
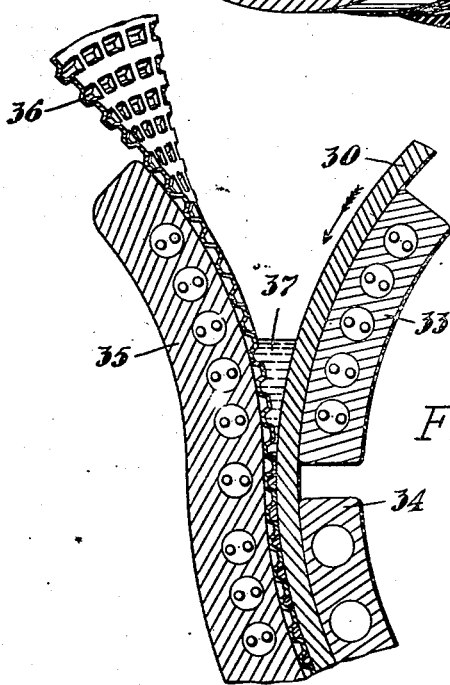
Inventor
Grosvenor D. Marcy.
by Henway & Witter Attys.

Patented Sept. 25, 1945

2,385,456

UNITED STATES PATENT OFFICE 2,385,456

METHOD OF MAKING MOLDS

Grosvenor D. Marcy, Newton Highlands, Mass., assignor to Boston Woven Hose & Rubber Company, Cambridge, Mass., a corporation of Massachusetts Original application June 26, 1941, Serial No. 399,861. Divided and this application June 23, 1942, Serial No. 448,076

5 Claims. (Cl. 154—2)

This application is a division of my copending application Serial No. 399,861 filed June 26, 1941, now matured into Patent 2,310,642 dated February 9, 1943.

My invention relates to a process for making interchangeable or replaceable shell molds for use in vulcanizing apparatus of the general type shown in Reissue Letters Patent No. 20,037, dated July 21, 1936, and issued upon an application of John M. Bierer. This type of machine employs a heated vulcanizing drum and an endless band tensioned against a part of the circumference of the drum, and in the operation of the machine sheet or strip material to be vulcanized is fed continuously under pressure between the band and the heated drum. It is sometimes desired to produce vulcanized stock having a characteristic surface configuration molded therein and heretofore this has been effected by engraving a selected pattern on the metal surface of the drum so that the drum molds the pattern into the sheet material while vulcanization is taking place. The cost of thus engraving a large drum is great and such an engraved drum is useful to produce only one pattern.

One object of my invention is to produce a demountable shell mold for use in conjunction with a vulcanizing drum of the type referred to, the mold being so constructed and arranged that it may be removed from the drum and replaced by similar molds of different patterns, thus making possible the use of an assortment of shell molds interchangeably with one drum for producing a variety of patterns from the same machine.

Another object of my invention is to reduce the cost of molding a pattern into material vulcanized in a machine of the type referred to.

One advantage resulting from my invention is that a manufacturer of rubber products in sheet form such as flooring, belting, mats, etc., can place on the market products having different selected attractive designs impressed therein without sacrificing the desirable characteristics obtained from continuous vulcanizing and at a price comparing favorably with smooth rubber products.

The process of my invention is characterized by providing a cylindrical shell with a coating of suitable plastic material, such as unvulcanized rubber, impressing a pattern into the surface of the coating, and then hardening the plastic coating, as by vulcanizing the rubber, to fix permanently its surface configuration with the pattern impressed therein. The process of my invention may be employed with particular advantage in providing a shell mold which is flexible as a whole as herein explained, but it is not limited in that respect. It makes available an accurate and relatively inexpensive process for providing a shell mold more rapidly than has been heretofore possible. For illustrative purposes I have herein shown the process of my invention as carried out in providing a mold having a sandpaper surface which is impressed in a rubber layer of the mold from an actual sandpaper pattern. Any other surface configuration may be produced from a corresponding positive pattern.

My invention is not, however, limited to the employment of rubber as a pattern carrying medium, but may be carried out with the assistance of plastic mediums which are impressionable at moderate temperatures, or by electrolytic deposition.

These and other features and objects of my invention will be more readily understood and appreciated from the following detailed description of a preferred embodiment thereof selected for purposes of illustration and shown in the accompanying drawings in which:

Fig. 1 is a diagrammatic view in cross-section showing the process of making the mold, and incidentally the machine or apparatus in which it is employed, Fig. 2 is a fragmentary view in perspective of a shell mold constructed according to my invention, parts being broken away to show details of construction, Fig. 3 is a view in cross section showing how the abrasive granules are left in the surface of the nearly completed mold, and Fig. 4 is a view in cross section showing one step in an alternative process of making a mold.

The general organization of the vulcanizing machine is diagrammatically shown in Fig. 1, where it will appear that a heated rotatable cylindrical drum 10 is partially encircled by a metallic pressure band 12 supported and guided in its path by a pair of rollers 14 and 16 disposed in advance of the drum 10 and a third roller 18 disposed at the rear of the drum 10. The roller 18 is adjustably mounted to provide varying degrees of pressure of the band 12 against the drum. One bearing of the drum is removable to permit an endless belt to be slipped over the drum. The band 12 moves with the drum, the roller 14 being driven from a suitable source.

In one aspect my invention consists in a process of making a shell mold to be placed on the drum to mold a pattern into the surface of rubberized stock pressed against the surface of the drum. Fig. 2 shows the construction of the mold. A shell 20 is formed preferably by butt-welding the edges of a rolled steel sheet to form a cylinder having an inside diameter slightly larger than the outside diameter of the drum 10. I have found that sheet steel 1/16" thick will form a satisfactory shell having the requisite flexibility when used with a drum about 60" in diameter. As a matter of fact the shell 20 is so thin that it will not hold its cylindrical shape without support, but tends to flatten of its own weight. The fact that the shell is slightly larger than the drum is important, since the shell must be capable of relatively easy application to and removal from the drum. For a 5 ft. drum the clearance of the shell should be about 1/8".

After carefully cleaning the shell 20 I coat it with cement and then wind strips of rubberized fabric 22 upon it, the winding being in spirals and very tightly held on the shell. Then I cement upon this foundation a layer of unvulcanized rubber 24 which coats the fabric 22. The dimensions are not critical, but the fabric may conveniently be wound to a thickness of 1/8" or less and the rubber coating may be 1/16" thick.

The choice of a pattern for the mold is not important, and I will describe the making of a sandpaper surface pattern mold by way of illustration. The rubber coated shell 20 is slipped over the drum 10 and the bearings of the roller 18 are adjusted to tension the band against the drum 20. When this has been done, the shell will hug the drum beneath the pressure band, but will separate and bulge therefrom in that part of its circumference which is not under pressure as shown at 25. In other words the band 12 forces the shell to follow the contour of the drum through a portion of its circumference, the slack being confined to the portion of the shell not held by the band. Rings (not shown) may be secured to the drum to prevent the shell from shifting axially along the drum.

A strip of abrasive cloth 26, or sandpaper, is fed into the machine between the band 12 and the rubber 24 as the drum is slowly rotated, the abrasive side of the strip facing the rubber. As the heated drum rotates and the band moves along with the drum, the cloth 26 is drawn into the bite between the drum and the band on the roller 16 and is pressed tightly toward the drum so that the projecting grains are embedded in the rubber. When the leading edge of the abrasive cloth approaches the oncoming cloth, the machine is stopped and the cloth 26 is cut to form an edge which abuts closely against the leading edge. This joint must be skillfully made in order to prevent a disfiguring break in the pattern. When the joint has been made, the machine is run until the joint passes under the band on the drum.

The shell 20 with the pattern cloth 26 is then removed from the drum and wrapped in fabric, the outer layers of which are wet. The wrapped shell is placed in a vulcanizing chamber where the layers 22 and 24 are vulcanized. The drying and consequent shrinking of the wet fabric squeezes the abrasive cloth even more tightly against the rubber, and so maintains it during the vulcanizing operation. At the same time the individual abrasive grains are freed from their bonding engagement with the cloth backing, and when the fabric and cloth 26' are later stripped off, the grains remain in the rubber layer 24 and the pattern of the abrasive cloth has been vulcanized into the surface of the rubber. The granules of sand or abrasive are subsequently scrubbed out of the rubber layer and the shell mold is thus completed and ready for use. The place where the joint came in the pattern cloth is then hand tooled to remove imperfections.

When it is desired to use the mold thus made, the shell is again slipped over the drum and the sheet, belt or strip to be molded and vulcanized is fed into the bite between the shell and the pressure band. The band thereupon presses the pattern into the adjacent face of the belt and the belt is vulcanized during its passage around the drum beneath the pressure band.

Fig. 3 illustrates the step of stripping the emery cloth sheet from the surface of the vulcanized rubber layer 24 after the vulcanizing operation. Usually the heat of that operation destroys the bond between the abrasive grains and the sheet 26' so that the grains, or most of them, are left embedded in the rubber when the sheet 26' is pulled away. The grains may be subsequently removed by a scraping or wire brushing operation, leaving the desired characteristic pitted surface configuration in the mold.

When it is desired to use the mold thus made, the shell is again slipped over the drum and the sheet, belt or strip to be molded and vulcanized is fed into the bite between the shell and the pressure band. The band thereupon presses the pattern into the adjacent face of the belt and the belt is vulcanized during its passage around the drum beneath the pressure band. It will be understood that shells with the pattern coating formed thereon in accordance with the method herein defined can be made in a great variety of patterns, according to the relief pattern on the strip of matrix material corresponding to strip 26 fed into the machine while the coating material is in impressionable plastic condition.

In Fig. 4 is illustrated a process of applying to a cylindrical shell 30, of the same type as the shell 20, a metallic surface having a relief pattern formed therein. In this case there is first provided a thin copper sheet 36 formed in the surface configuration of the desired pattern and of sufficient width and length to cover the drum. This is done preferably by electro-deposition of copper upon a cathode which comprises an aluminum roller of convenient size. The cathode roll is of a length corresponding to the width of the strip 36 to be produced and its cylindrical surface is engraved with a positive of the proposed design. The roller is slowly turned in the electrolytic solution and the finished strip 36 continuously stripped from the cathode where it emerges from the electrolyte. A 6" diameter cathode roll has been found adequate for this step of the process.

After having prepared a thin copper sheet such as the sheet 36 in Fig. 4 in a thickness of about .012-.015" the sheet is fed continuously to the slowly moving surface of the shell 30 while the latter is heated by any suitable means as, for example, the fixed segmental electric heater 33 shown in Fig. 4.

The sheet 36 is guided tangentially to the surface of the shell 30 by a fixed external heater 35, and a pool of liquid solder 37 is maintained between the shell surface and the inner surface of the sheet 36. The solder is carried down into cavities of the pattern in the sheet 36 and is solidified as a foundation material solidly backing up the sheet metal upon the surface of the shell 30. 34 indicates a fixed segmental cooler which is effective to chill the solder backing after it passes the bight of the shell 30.

It will be apparent now that I have invented a mold for rotary vulcanizing machines, which is relatively light, easily constructed, and which can be manipulated without difficulty. The expense of engraving a vulcanizing drum has been eliminated, and the manufacturing cost of patterned sheet rubber products materially reduced. The shell mold per se is not claimed herein but forms the subject matter of my Patent No. 2,310,642, dated February 9, 1943.

Having now described and illustrated my invention, what I claim as new and desire to secure by Letters Patent of the United States is:

1. The process of making a mold for use in a vulcanizing machine employing a heated drum and a pressure band tensioned around a portion of the circumference of the drum, which comprises uniting the ends of a thin sheet of metal to form a shell having an inside diameter larger than the outside diameter of the drum, wrapping fabric around the shell, coating the wrapped shell with a layer of unvulcanized rubber, supporting the coated shell on the drum beneath the pressure band, rotating the drum, feeding in between the pressure band and the coated shell a strip of material having a relief pattern in the surface next to the rubber on the shell to press the pattern into the rubber, removing the shell with the strip wrapped about it, covering the wrapped shell with wet fabric, and vulcanizing the rubber on the shell while it is in contact with the material having the relief pattern and at the same time shrinking the fabric wrapping upon the rubber being vulcanized.

2. A process of making a mold for use in a vulcanizing machine employing a heated drum and a pressure band tensioned around a portion of the circumference of the drum, which comprises providing a flexible, cylindrical shell, coating the shell with unvulcanized rubber, supporting the shell on the drum beneath the pressure band, feeding between the coated shell and the pressure band a sheet carrying a relief pattern, rotating the drum to squeeze the relief pattern into the rubber, and then vulcanizing the rubber coating on the shell.

3. The process of making cylindrical molds for rotary vulcanizing machines, which includes the steps of providing a metallic shell having a rubber coating, rolling the projecting grains of an abrasive sheet into the surface of said rubber coating under pressure and heat, vulcanizing the rubber coating while the grains are embedded therein, and subsequently removing the grains, thereby leaving a pitted surface configuration in the mold.

4. The process of making cylindrical molds for rotary vulcanizing machines, which includes the steps of providing a metallic shell having a rubber coating, rolling the projecting grains of an abrasive sheet into the surface of said rubber coating under pressure and heat, vulcanizing the rubber coating while the grains are embedded therein and at the same time loosening the grains from the sheet, stripping the sheet from the vulcanized rubber coating, and subsequently removing the grains therefrom.

5. A process of making a mold for use in a vulcanizing machine employing a heated drum and a pressure band tensioned around a portion of the circumference of the drum, which comprises providing a cylindrical shell of a size to removably fit the drum, coating the outer cylindrical face of the shell with plastic material that is impressionable at moderate temperature, supporting the shell on the drum beneath the pressure band, rotating the drum and shell, feeding between the coated shell and the pressure band a sheet carrying a relief pattern in contact with the plastic material coating, thereby impressing said pattern into the coating, and thereafter hardening the plastic material to fix permanently its surface configuration with the pattern impressed therein.

GROSVENOR D. MARCY.